United States Patent
Mustalahti et al.

(10) Patent No.: US 9,890,017 B2
(45) Date of Patent: Feb. 13, 2018

(54) METHOD AND APPARATUS FOR MEASURING THE LOAD OF A CAR OF A TRACTION SHEAVE ELEVATOR

(71) Applicants: Jorma Mustalahti, Hyvinkaa (FI); Matti Räsänen, Hyvinkaa (FI); Esko Aulanko, Kerava (FI)

(72) Inventors: Jorma Mustalahti, Hyvinkaa (FI); Matti Räsänen, Hyvinkaa (FI); Esko Aulanko, Kerava (FI)

(73) Assignee: Kone Corporation, Helsinki (FI)

( * ) Notice: Subject to any disclaimer, the term of this patent is extended or adjusted under 35 U.S.C. 154(b) by 461 days.

(21) Appl. No.: 14/539,220

(22) Filed: Nov. 12, 2014

(65) Prior Publication Data

US 2015/0068325 A1 Mar. 12, 2015

Related U.S. Application Data

(63) Continuation of application No. PCT/FI2013/050581, filed on May 28, 2013.

(30) Foreign Application Priority Data

Jun. 4, 2012 (FI) .................................. 20125608

(51) Int. Cl.
*G01L 5/00* (2006.01)
*B66B 5/00* (2006.01)
(Continued)

(52) U.S. Cl.
CPC .......... *B66B 5/0031* (2013.01); *B66B 1/3476* (2013.01); *B66B 5/14* (2013.01);
(Continued)

(58) Field of Classification Search
CPC ....... B66B 5/0031; B66B 1/3476; B66B 5/14; B66D 5/14; B66D 5/30; G01G 19/14
(Continued)

(56) References Cited

U.S. PATENT DOCUMENTS 3,610,342 A 10/1971 Stainken
4,013,142 A * 3/1977 Hagg ...................... B66B 15/04
187/254

(Continued)

FOREIGN PATENT DOCUMENTS

CN 101128381 A 2/2008
CN 201914874 U 8/2011
(Continued)

OTHER PUBLICATIONS

International Search Report for PCT/FI2013/050581 dated Sep. 9, 2013.
(Continued)

*Primary Examiner* — Max Noori
(74) *Attorney, Agent, or Firm* — Harness, Dickey & Pierce, P.L.C.

(57) ABSTRACT

The object of the invention is a method and an apparatus for measuring the load of an elevator car, which elevator comprises at least a hoisting machine plus shaft, said hoisting machine being provided with a motor, and a traction sheave fitted onto the shaft, and also a brake, and in which solution the load of an elevator car is measured by the aid of a measuring means. The load of the elevator car is measured with the measuring means from the shaft of the traction sheave of the hoisting machine.

17 Claims, 5 Drawing Sheets

(51) Int. Cl.
- *B66B 5/14* (2006.01)
- *G01G 19/14* (2006.01)
- *B66B 1/34* (2006.01)
- *B66D 5/14* (2006.01)
- *B66D 5/30* (2006.01)

(52) U.S. Cl.
CPC ............... *B66D 5/14* (2013.01); *B66D 5/30* (2013.01); *G01G 19/14* (2013.01)

(58) Field of Classification Search
USPC ........................... 73/862, 56, 862.56
See application file for complete search history.

(56) References Cited

U.S. PATENT DOCUMENTS

| | | | | |
|---|---|---|---|---|
| 4,766,977 | A * | 8/1988 | Yamasaki | B66B 5/145 187/392 |
| 4,805,741 | A | 2/1989 | de Jong et al. | |
| 6,488,128 | B1 * | 12/2002 | Slabinski | B66B 1/28 187/393 |
| 6,830,131 | B2 * | 12/2004 | Mustalahti | B66B 11/0045 187/254 |
| 7,753,176 | B2 * | 7/2010 | Kigawa | B66B 5/044 187/280 |
| 7,806,237 | B2 * | 10/2010 | Aulanko | B66B 11/08 187/264 |
| 8,104,586 | B2 * | 1/2012 | Traktovenko | B66B 1/3476 187/277 |
| 2003/0057031 | A1 * | 3/2003 | Gottlieb | B64D 9/00 187/394 |
| 2003/0070881 | A1 * | 4/2003 | Nagata | B66B 11/0438 187/289 |
| 2009/0120728 | A1 * | 5/2009 | Traktovenko | B66B 1/3476 187/391 |
| 2012/0023863 | A1 * | 2/2012 | Van Der Meijden | B66B 19/00 52/741.1 |
| 2014/0311257 | A1 * | 10/2014 | Hubbard | B66B 5/0037 73/862.12 |
| 2017/0101289 | A1 * | 4/2017 | Stolt | B66B 1/304 |

FOREIGN PATENT DOCUMENTS

| | | |
|---|---|---|
| CN | 102348628 A | 2/2012 |
| SE | 532028 C2 | 10/2009 |
| WO | WO-2004/058618 A1 | 7/2004 |

OTHER PUBLICATIONS

Written Opinion for PCT/FI2013/050581 dated Sep. 3, 2013.
Finnish Search Report for FI20125608 dated Oct. 16, 2012.
Chinese Office Action dated Apr. 20, 2017 by SIPO for corresponding CN Application No. 201380029456.4.
Office Action dated Oct. 14, 2016 by the Patent Office of SIPO for corresponding Application No. 201380029456.4.

* cited by examiner

METHOD AND APPARATUS FOR MEASURING THE LOAD OF A CAR OF A TRACTION SHEAVE ELEVATOR

This application is a continuation of PCT International Application No. PCT/FI2013/050581 which has an International filing date of May 28, 2013, and which claims priority to Finnish patent application number 20125608 filed Jun. 4, 2012, the entire contents of both which are incorporated herein by reference.

Example embodiments relate to a method and an apparatus for measuring a load of an elevator car of a traction sheave elevator.

In modern elevators the load of the elevator car is usually measured so that, inter alia, the hoisting machine would be able to give exactly the right torque when it starts moving, in which case starting would occur as softly and as smoothly and as pleasingly to passengers as possible. In solutions according to prior art the load of an elevator car is measured by means of a load weighing device, which load weighing device is disposed in some suitable location, e.g. in the rope anchorage. A problem in this type of solution is, however, that depending on the position of the elevator car and counterweight at any given time, measuring errors arise due to frictions and support errors. When the load data is not accurate, the smoothness of starting suffers.

One or more example embodiments eliminate the aforementioned drawbacks and to achieve a simple and low-cost method and apparatus for measuring the load of a car of a traction sheave elevator, which enables the measuring of a load more accurately and error-free.

Preferably the invention is expressed as a method for measuring the load of an elevator car of a traction sheave elevator, which elevator comprises at least a hoisting machine plus shaft, said hoisting machine being provided with a motor, and a traction sheave fitted onto the shaft, and also a brake, and in which method the load of an elevator car is measured by the aid of a measuring means from the shaft of the traction sheave of the hoisting machine.

Preferably the load of the elevator car is measured from the shaft of the traction sheave via the brake of the elevator, even more preferably it is measured by the aid of a measuring means fitted between the frame flange transmitting the torque of the shaft and the frame of the hoisting machine, said frame flange being connected to the brake of the elevator and mounted on bearings on the shaft, and more particularly preferably the load of an elevator car is measured within the limits of the margin of rotational movement of the frame flange given by the play of the lock means disposed in connection with the frame flange.

A preferred apparatus implementing the invention for measuring the load of an elevator car of a traction sheave elevator comprises at least a hoisting machine with shaft and a traction sheave fitted onto the shaft and also a brake and a measuring means for measuring the load of the elevator car, which measuring means is arranged to measure the load of the elevator car from the shaft of the traction sheave. Preferably, in the apparatus, measuring of the load of an elevator car is arranged within the limits of the play of the lock means disposed in connection with the frame flange transmitting the torque of the shaft.

Some inventive embodiments are also discussed in the descriptive section of the present application. The inventive content of the application can also be defined differently than in the claims presented below. The inventive content may also consist of several separate inventions, especially if the invention is considered in the light of expressions or implicit sub-tasks or from the point of view of advantages or categories of advantages achieved. In this case, some of the attributes contained in the claims below may be superfluous from the point of view of separate inventive concepts. Likewise the different details presented in connection with each embodiment can also be applied in other embodiments. In addition it can be stated that at least some of the subordinate claims can in at least some situations be deemed to be inventive in their own right.

The invention can be expressed as a preferred embodiment as a type of method for measuring the load of the elevator car of a traction sheave elevator with a measuring means from the shaft of a traction sheave belonging to the hoisting machine, in which method the load of an elevator car is measured within the limits of the margin of rotational movement of the frame flange given by the play of the lock means disposed in connection with the frame, e.g. in connection with the frame flange that is in the frame.

The invention can be expressed as a preferred embodiment as an apparatus for measuring the load of the elevator car of a traction sheave elevator with a measuring means from the shaft of a traction sheave belonging to the hoisting machine, in which case the measuring of the load of the elevator car is arranged within the limits of the margin of rotational movement of the frame flange given by the play of the lock means disposed in connection with the frame, e.g. in connection with the frame flange that is in the frame.

One advantage, among others, of the solution according to the invention is that by means of it the load of elevator car can be measured accurately and without error. From this follows the advantage that the starting of the elevator can be realized smoothly and pleasantly for the people in the elevator. Another advantage of the solution is that it is simple and inexpensive to implement.

In the following, the invention will be described in more detail by the aid of some examples of its embodiment with reference to the attached drawings, wherein.

Figure 1:
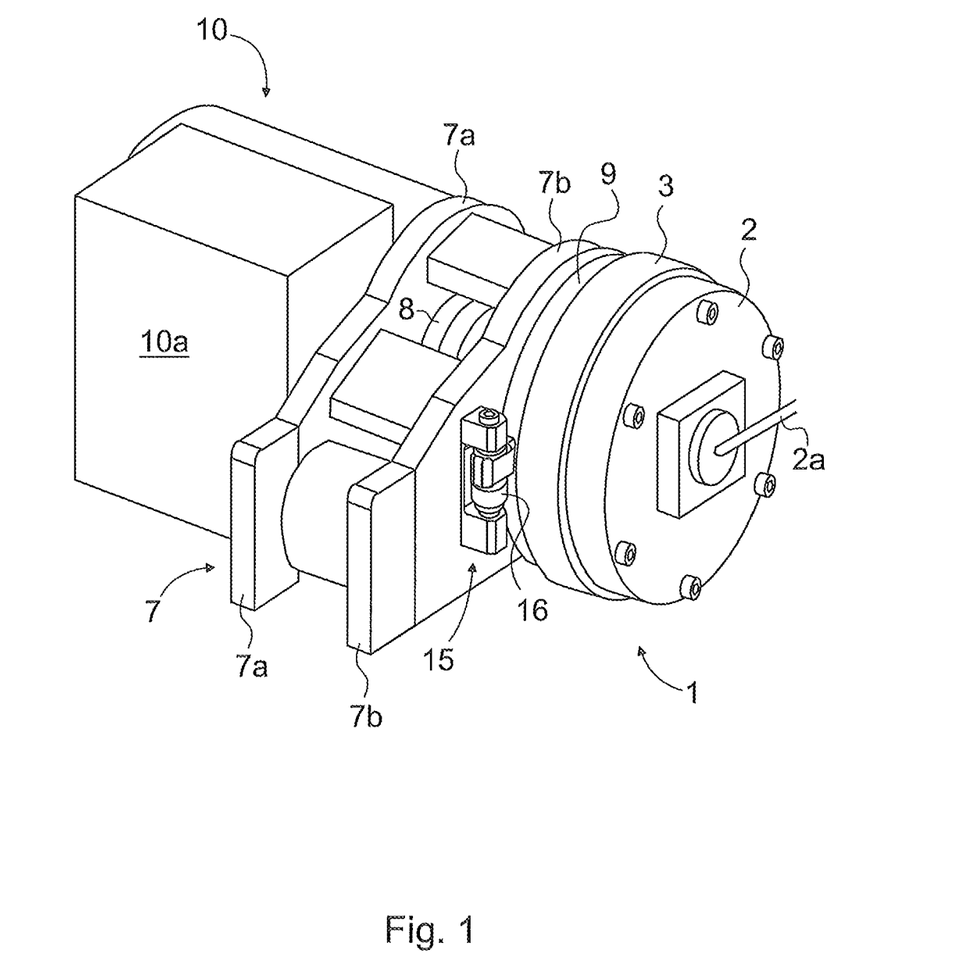
FIG. 1 presents a simplified view obliquely from the side and top of one brake arrangement of an elevator, in which the load-measuring solution according to the invention is used.
Figure 2:
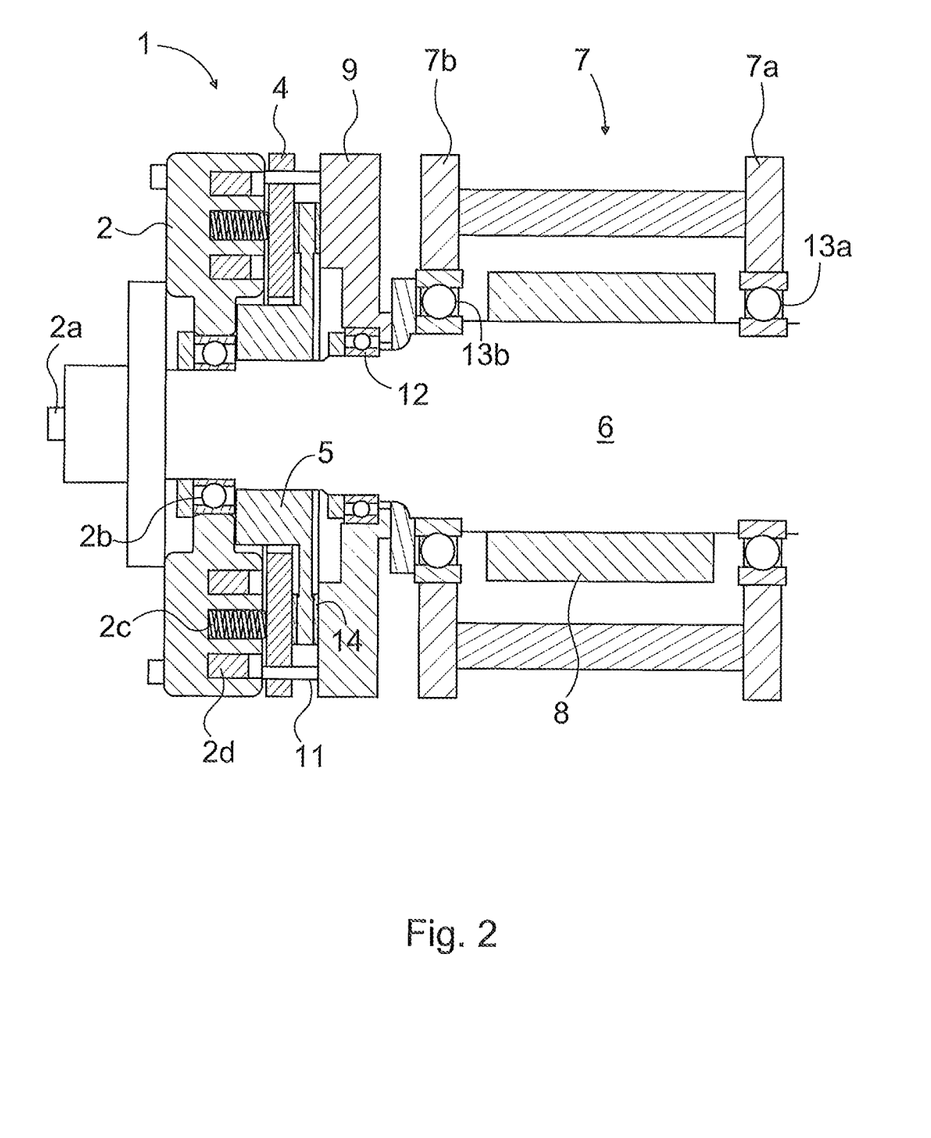
FIG. 2 presents a simplified and partially sectioned side view of the brake arrangement of an elevator according to FIG. 1.

FIG. 1 presents a simplified view obliquely from the side and top and FIG. 2 a simplified and partially sectioned side view of one brake solution for an elevator, in which a load-measuring solution according to the invention is used. The brake 1 of an elevator hoisting machine 10 provided with a motor comprises a magnet part 2, an armature plate 4 fitted inside an enclosure 3, and a brake disc 5 as well as a frame flange 9, all of which are fitted around the shaft 6 of the hoisting machine 10. The figure is sectioned, apart from the magnet part 2, at the center line of the shaft 6 of the hoisting machine. The magnet part 2, for its part, is sectioned at a different point in such a way that the springs 2c fitted into the magnet part 2 are visible. The shaft 6 and some other parts, such as the springs 2c and screws 11, are not sectioned.

The frame 7 of the hoisting machine 10 is composed of two frame parts 7a and 7b, fixed together at a distance from each other, which form a framework, between which is space for the traction sheave 8. The frame 7 can also be an integral casting, in which case the frame parts 7a, 7b are not separate but instead belong to the same casting. The frame 7 is fixed to other structures of the elevator or of the building. The hoisting machine 10 and the enclosure 10a containing the means that are needed for its control are fixed to a first side of the first body part 7a. The shaft 6 of the motor of the hoisting machine 10 is led from the motor through the frame part 7a to the traction sheave 8 on the other side of the frame part 7a, which traction sheave is fixed to the shaft 6 to rotate along with the shaft 6. After traveling through the traction sheave 8 the shaft 6 is led onwards through the second frame part 7b to fully the other side of the frame 7. The shaft 6 is mounted with bearings in the first frame part 7a by means of the bearings 13a and in the second frame part 7b by means of the bearings 13b.

A frame flange 9 is fitted around the shaft 6 on the second side of the frame 7. Between the shaft 6 and the frame flange 9 is a bearing 12, which enables the frame flange 9 to stay in its place despite the rotation of the shaft 6. In addition, the frame flange 9 is fixed to the frame 7 via measuring means 16. The measuring means 16 is arranged to measure the torque exerted on the frame flange 9 of the brake 1, when the brake is closed. As viewed from the motor, after the frame flange 9 a brake disc 5 is fitted onto the shaft 6, which brake disc is fixed to the shaft 6 and arranged to rotate along with the shaft 6. After the brake disc 5 an armature plate 4 is fitted onto the shaft 6, which armature plate is fixed between the frame flange 9 and the magnet part 2 by the aid of screws functioning as fixing means 11 in such a way that the armature plate 4 is able to slide guided by the fixing means 11 when the brake opens and closes. After this, the magnet part 2 of the brake 1 is on the shaft 6, which magnet part is fitted to the shaft 6 with bearings 2b. The magnet part 2 and the frame flange 9 are connected to each other by the aid of the screws functioning as fixing means 11 in such a way that the distance between them in the longitudinal direction of the shaft 6 remains essentially unchanged.

Springs 2c and also windings 2d are fitted in connection with the magnet part 2 functioning as the opening magnet of the brake. The opening magnet of the brake is divided into at least two separate windings, because elevator regulations require that there must be more than one winding in a brake. The windings 2d receive current via a cable 2a. The brake 1 of the hoisting machine is arranged to function in such a way that when the brake is open current flows in the windings 2d and they pull the armature plate 4 off the brake disc 5, in which case the shaft 6 is free to rotate on its bearings. When current is disconnected from the windings 2d, the springs 2c press the armature plate 4 in the direction of the frame flange 9, in which case the brake disc 5 is pressed between the armature plate 4 and the frame flange 9 and the friction surfaces 14 on the brake disc 5 engage with the armature plate 4 and with the frame flange 9 and the brake 1 brakes.

Figure 3:
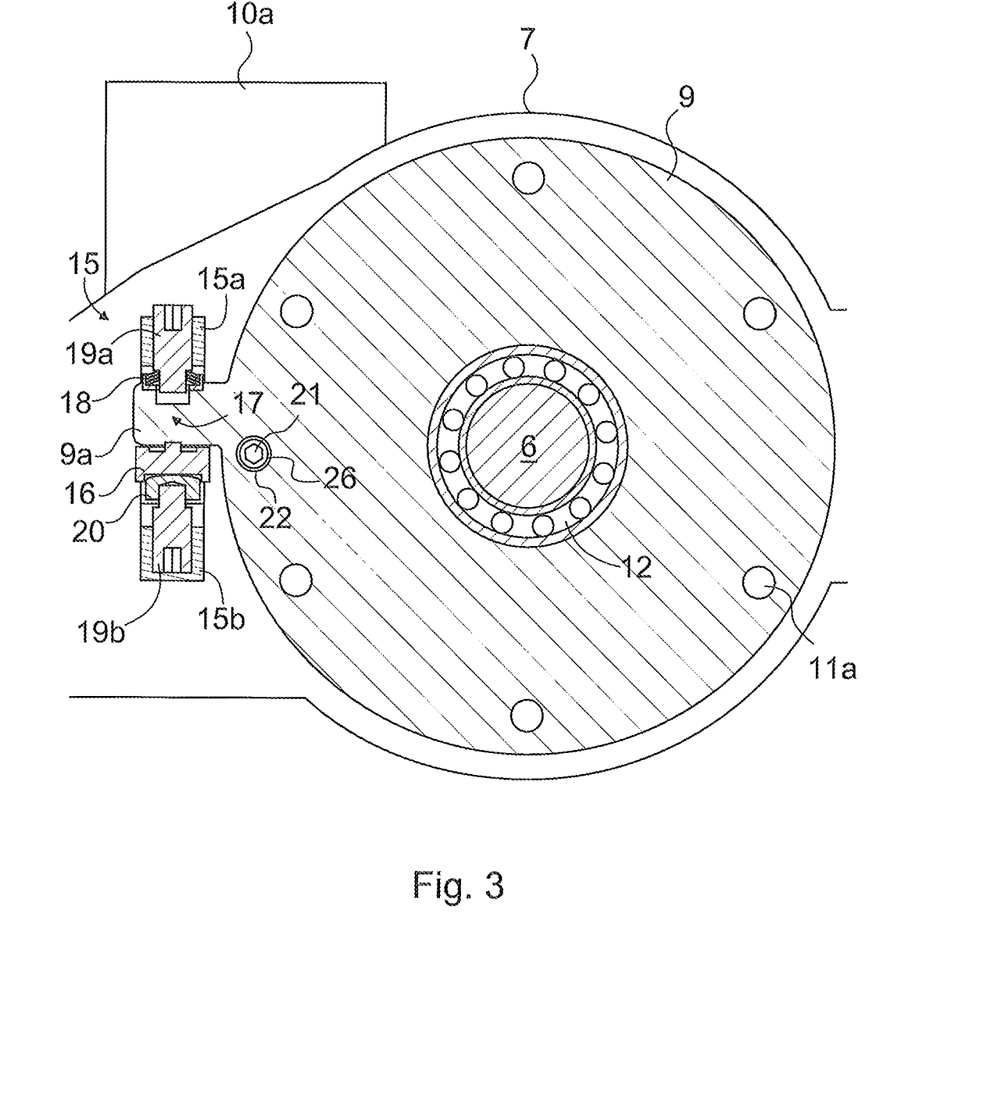
FIG. 3 presents one embodiment of the solution according to the invention when partially sectioned and as viewed in the direction of the shaft of the hoisting machine of the elevator.

FIG. 3 presents one embodiment of the solution according to the invention when partially sectioned and as viewed in the direction of the shaft 6 of the hoisting machine 10 of the elevator. The frame flange 9 of the brake 1 is mounted on bearings on the shaft 6 of the hoisting machine 10 by the aid of the bearing 12. The frame flange 9 is a disc-shaped component, comprising a fixing part 9a protruding to the side in a radial direction from the center line of the flange, from which fixing part the frame flange 9 is connected to the frame of the machine. Correspondingly, the frame 7 comprises a fixing part 15 protruding in the longitudinal direction of the shaft 6 in the direction of the frame flange 9, to which fixing part the frame flange 9 is connected from its fixing part 9a.

In the frame flange 9 is a plurality of holes 11a for the coupling means 11 connecting the frame flange 9 and the magnet part 2. Correspondingly, there are holes in the corresponding points in the armature plate 4 and in the magnet part 2.

The top part 15a and bottom part 15b of the fixing part 15 of the frame 7 protrude more from the frame 7 than the center part of the fixing part 15, in which case a space 17 forms between them in the center of the fixing part 15, into which space the fixing part 9a of the frame flange 9 is fitted. In addition, a force sensor based on compression and functioning as a measuring means 16 is fitted into the space 17 below the fixing part 9a of the frame flange 9, and a cup spring stack functioning as a spring means 18 is fitted above the fixing part 9a. In the top part 15a and bottom part 15b of the fixing part of the frame 7 are vertical through-holes, into which are fitted screws 19a and 19b, by the aid of which the fixing part 9a of the frame flange 9 is tightened to a suitable tightness between the spring means 18 and the force sensor 16. An intermediate piece 20 is additionally fitted between the lower screw 19b and the force sensor 16.

The frame flange 9 of the brake is thus mounted on bearings on the shaft 6 and is freely supported via its fixing part 9a to the frame 7 of the hoisting machine. When the brake 1 is open, the shaft 6 is free to rotate on the bearings 12 of the frame flange 9. When the brake 1 is closed, the brake disc 5 is pressed between the armature plate 4 and the frame flange 9, in which case the brake 1 brakes and stops the rotation of the shaft 6. In this case torque is exerted on the frame flange 9, which torque is transmitted via the fixing part 9a of the frame flange 9 to the force sensor 16, which is arranged to measure this torque. The torque depends on the load of the elevator car at any given time, in which case the load of the elevator car can be calculated from the torque.

The force sensor 16 is arranged to measure a force exerted on it. The cup spring stack 18 is arranged to press the fixing part 9a of the frame flange 9 towards the force sensor and the spring force of the cup spring stack 18 is dimensioned in such a way that the reaction force produced by the torque of the brake 1 never exceeds the maximum force of the spring. When the shaft 6 tries to rotate in the situation of FIG. 3 clockwise and the brake 1 is closed, the torque of the brake 1 reduces the force exerted on the force sensor 16 by the springs 18. When the shaft 6 tries to rotate counterclockwise and the brake is closed, the reaction force produced by the torque is exerted directly on the force sensor 16.

The brake 1 also comprises a lock means 21, which is arranged to ensure the holding of the brake in the event that the measuring means 16 connecting the frame flange 9 to the frame 7 of the brake, or the fixing of said measuring means, is damaged. In this embodiment the lock means 21 is a screw fixed to the frame 7 of the hoisting machine, which screw is fitted into a hole 22 that is made in the frame flange 9 and that is larger in its diameter than the screw in such a way that there is play 26 of the desired magnitude between the lock means 21 and the hole 22. If the measuring means 16 or its fixing fails, the screw 21 functioning as a lock means prevents rotation of the frame flange 9, in which case the brake holds. In normal operation measuring of force is realized within the limits of the margin of rotational movement of the frame flange 9 given by the reciprocal play between the lock means 21 and the hole 22.

Figure 4:
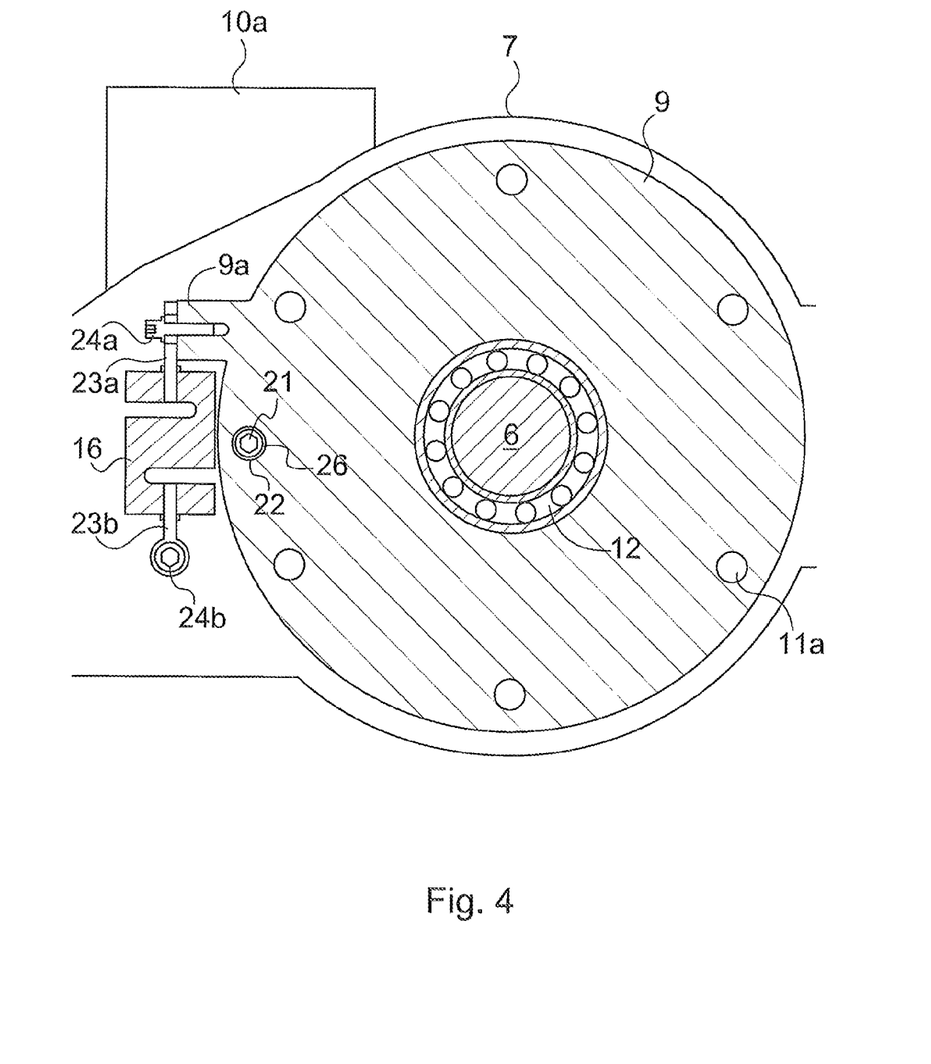
FIG. 4 presents a second embodiment of the solution according to the invention when partially sectioned and as viewed in the direction of the shaft of the hoisting machine of the elevator.

FIG. 4 presents a second embodiment of the solution according to the invention when partially sectioned and as viewed in the direction of the shaft 6 of the hoisting machine 10 of the elevator. The frame flange 9 is mounted on bearings on the shaft 6 in the manner of the preceding embodiment and the frame flange 9 comprises a fixing part 9*a* slightly above the center line of the flange and protruding from the outer rim of the flange towards the side. The frame flange 9 is connected via its fixing part 9*a* to the top end of a load cell functioning as a measuring means 16. The load cell functioning as a measuring means 16 is S-shaped and is fixed at its bottom end to the frame 7 of the hoisting machine 10. A fixing means 23*a* is fixed to the top part of the load cell, which fixing means is in turn fixed at its second end to the fixing part 9*a* of the frame flange 9 by means of a screw 24*a*. Correspondingly, a fixing means 23*b* is fixed to the bottom part of the load cell, which fixing means is in turn fixed at its second end to the frame 7 of the machine by means of a screw 24*b*.

In this embodiment also the shaft 6 is free to rotate on its bearings 12 of the frame flange 9, when the brake is open. When the brake 1 is closed, the brake disc 5 is pressed between the armature plate 4 and the frame flange 9, in which case the brake 1 brakes and stops the rotation of the shaft 6. In this case torque is exerted on the frame flange 9, which when the frame flange 9 tries to rotate, in the situation of FIG. 4 clockwise, elongates via the fixing part 9*a* of the frame flange 9 the load cell functioning as a measuring means 16. From the amount of elongation of the load cell, the load of the elevator car can be calculated. When the shaft 6 tries to rotate counterclockwise, the load cell is compressed, in which case the load can be calculated from the compression of the load cell.

Figure 5:
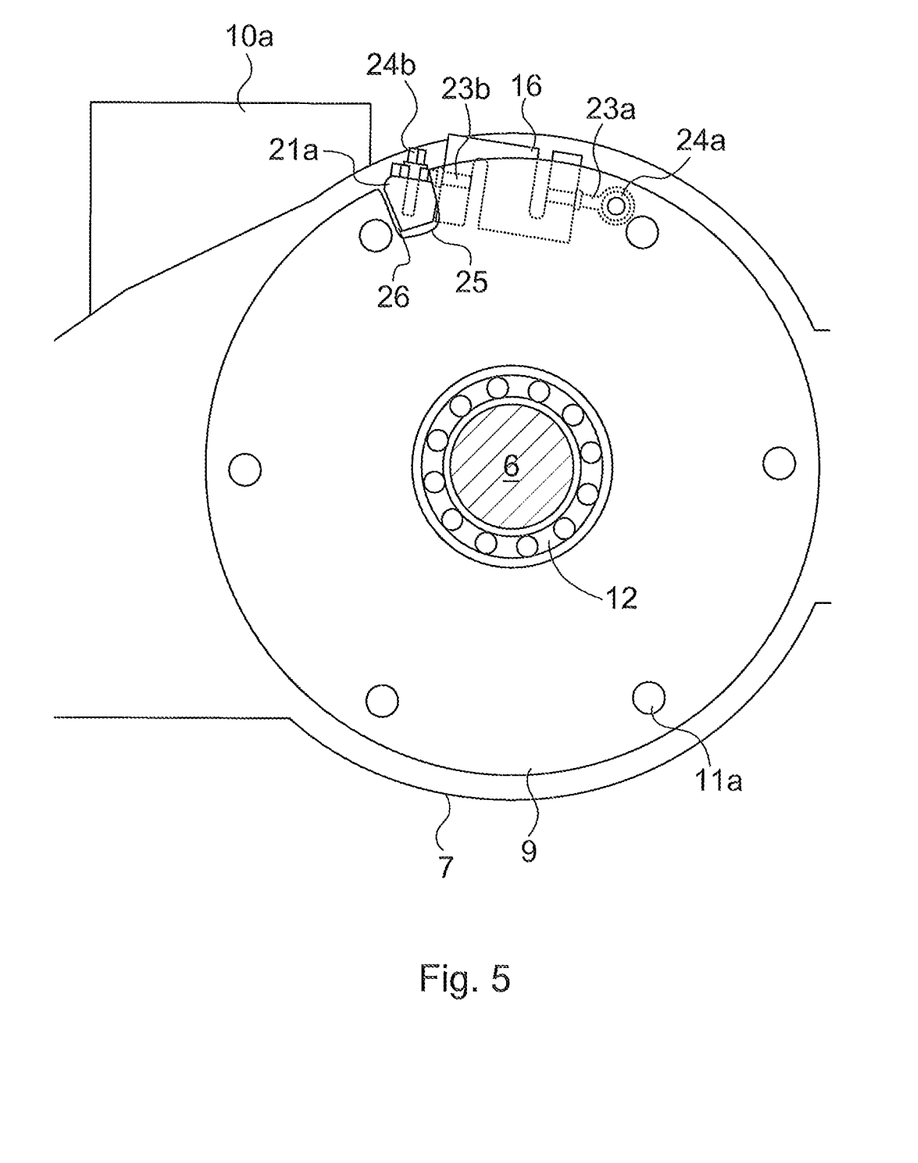
FIG. 5 presents a third embodiment of the solution according to the invention when partially sectioned and as viewed in the direction of the shaft of the hoisting machine of the elevator.

FIG. 5 presents a third embodiment of the solution according to the invention when partially sectioned and as viewed in the direction of the shaft 6 of the hoisting machine 10 of the elevator. In this solution also an essentially S-shaped load cell is used as the measuring means 16. Differing to the preceding embodiment, the load cell is now disposed between the frame 7 of the hoisting machine and the frame flange 9 in the longitudinal direction of the shaft 6. At the first end of the measuring means 16 is a fixing means 23*a*, from which the measuring means 16 is fixed to the frame flange 9 by the aid of a screw 24*a*. At the second end of the measuring means 16 is a fixing means 23*b*, from which the measuring means 16 is fixed to the lock means 21*a* in the frame 7 of the machine. In this solution a slot 25 is made in the rim of the frame flange 9, into which slot the lock means 21*a* is fitted in such a way that there is play 26 of the desired magnitude between the lock means 21*a* and the hole 25. In this embodiment the lock means 21*a* is e.g. a metal piece, following the shape of the slot 25 but smaller than the slot, welded to the frame 7, in which piece threads are made for the fixing screw 24*b* of the measuring means 16. In normal operation measuring of force is realized, in this solution also, within the limits of the margin of rotational movement of the frame flange 9 given by the reciprocal play between the lock means 21*a* and the hole 25. If the measuring means 16 or its fixing fails, the frame flange 9 engages with the lock means 21*a* that is in the slot 25. An advantage of this embodiment compared to that presented above is that placement of the measuring means 16 between the frame 7 and the frame flange 9 protects the measuring means 16 and saves space.

With the method according to the invention, the load of the elevator car is measured e.g. as follows: A measuring means 16, which is e.g. a force sensor or the S-sensor presented above, is fitted in connection with the shaft 6 of the elevator machine 10 and with the brake 1, and which measuring means 16 connects the frame flange 9 of the brake 1 to the frame 7 of the elevator machine 10. When the brake 1 of the elevator is closed, the torque of the shaft 6 is transmitted via the brake 1 and frame flange 9 to the measuring means 16, by the aid of the measuring data given by said measuring means the load of the elevator car is calculated. In this case the frame flange 9 rotates forced by the torque of the shaft 6 within the limits of the margin of rotational movement of the frame flange 9 given by the play 26 between the lock means 21*a* and the hole 25.

It is obvious to the person skilled in the art that the invention is not limited solely to the examples described above, but that it may be varied within the scope of the claims presented below. Thus, for example, the measuring means to be used for measuring load of an elevator car can be of another type than the force sensor based on compression or than the load cell based on compression and elongation that are presented above.

It is further obvious to the person skilled in the art that measuring means can also be disposed in another way with respect to the brake of the elevator than what is presented above. CLAIMS

The invention claimed is:

1. A method for measuring a load of an elevator car of a traction sheave elevator, the elevator including at least a hoisting machine and shaft, said hoisting machine including a motor, a traction sheave fitted onto the shaft, a frame flange fitted and a brake, the frame flange surrounding the shaft such that the shaft extends in a longitudinal direction through the frame flange with bearings therebetween, the frame flange connected to the brake, the brake configured to switch between an opened state and a closed state such that the shaft is configured to freely rotate on the bearings while the frame flange remains stationary if the brake is in the opened state and the shaft is configured to transmit torque to the frame flange if the brake is in the closed state, the method comprising:
 measuring, using a measuring device, the load of the car from the shaft of the traction sheave of the hoisting machine by transmitting the torque of the shaft to the measuring device via the frame flange when the brake is in the closed state.

2. The method according to claim 1, wherein the measuring includes measuring the load of the elevator car from the shaft of the traction sheave via the brake of the elevator.

3. The method according to claim 1, wherein the brake is configured to stop rotational movement of the shaft such that the torque generated by the shaft is communicated to the frame flange, and
 the measuring includes measuring the load of the elevator car based on the torque.

4. The method according to claim 1, wherein
 rotational movement of the frame flange is limited by play of a locking device associated with the frame flange.

5. The method according to claim 1, wherein
 the measuring device is a force sensor, and
 the measuring includes measuring, using the force sensor, the load of the elevator based on a compression force applied thereto.

6. The method according to claim 1, wherein
 the measuring device is a load cell, and the measuring includes measuring, using the load cell, the load of the elevator car based on elongation and compression thereof.

7. The method according to claim 1, wherein rotational movement of the frame flange is limited by play of a locking device associated with the frame.

8. An apparatus for measuring a load of an elevator car of a traction sheave elevator, the elevator including at least a hoisting machine and shaft, said hoisting machine including a motor, a traction sheave fitted onto the shaft, a frame flange fitted, and a brake, the frame flange surrounding the shaft such that the shaft extends in a longitudinal direction through the frame flange with bearings therebetween, the frame flange connected to the brake, the brake configured to switch between an opened state and a closed state such that the shaft is configured to freely rotate on the bearings while the frame flange remains stationary if the brake is in the open state, and the shaft is configured to transmit torque to the frame flange if the brake is in the closed state, the apparatus comprising:
- a measuring device configured to measure the load of the elevator car from the shaft of the traction sheave of the hoisting machine by transmitting the torque of the shaft to the measuring device via the frame flange when the brake is in the closed state.

9. The apparatus according to claim 8, wherein the measuring device is configured to measure the load of the elevator car from the shaft of the traction sheave via the brake of the elevator.

10. The apparatus according to claim 8, wherein the elevator hoisting machine further comprises:
- a locking device associated with the frame, the locking device configured to limit rotational movement of the frame flange.

11. The apparatus according to claim 8, wherein the elevator hoisting machine further comprises:
- a locking device associated with the frame flange, the locking device configured to limit rotational movement of the frame flange.

12. The apparatus according to claim 8, wherein the measuring device is a force sensor configured to measure the load of the elevator based on a compression force applied thereto.

13. The apparatus according to claim 8, wherein the measuring device is a load cell configured to measure the load of the elevator car based on elongation and compression thereof.

14. The apparatus according to claim 8, wherein the measuring device is between the frame of the hoisting machine and the frame flange in the longitudinal direction of the shaft.

15. The method according to claim 3, wherein the frame flange is between an opposing member and the measuring device, and the method further comprises:
- generating, via the opposing member, a spring force that opposes a reaction force generated based on the torque such that the reaction force is less than the spring force.

16. The apparatus according to claim 8, wherein the brake is configured to stop rotational movement of the shaft such that the torque generated by the shaft is communicated to the frame flange, and
- the measuring device is configured to measure the load of the elevator car based on the torque.

17. The apparatus according to claim 16, wherein the elevator hoisting machine further comprises:
- an opposing member configured to generate a spring force that opposes a reaction force generated based on the torque such that the reaction force is less than the spring force.

* * * * *